A. McGREGOR.
TOOL HOLDER OR CHUCK.
APPLICATION FILED MAR. 25, 1908.

929,466.

Patented July 27, 1909.
2 SHEETS—SHEET 1.

Witnesses
P. F. Nagle.
L. Douville.

Inventor
Alexander McGregor,
By Wiederoheim + Fairbanks.
Attorneys.

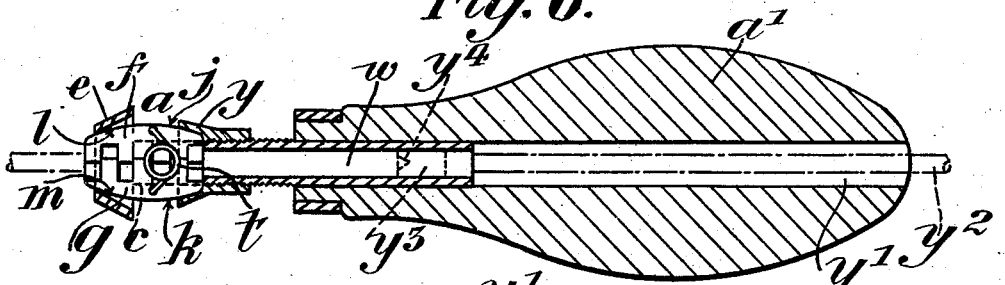
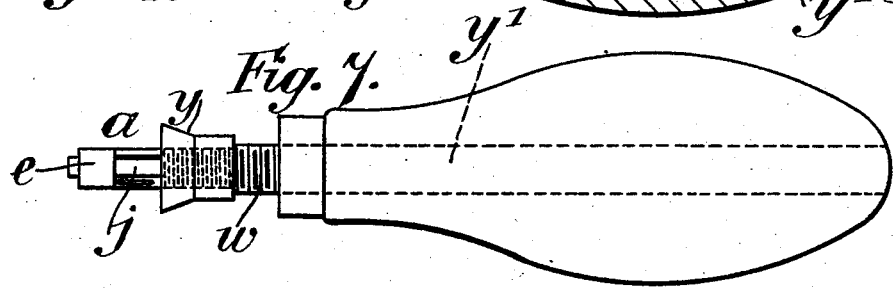
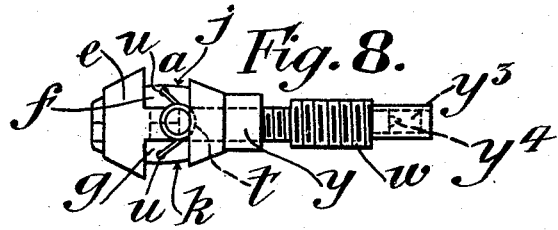
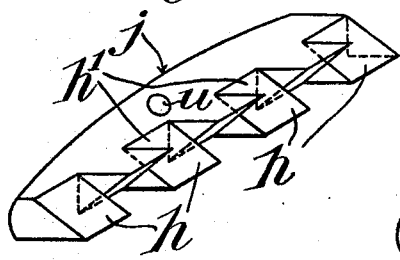
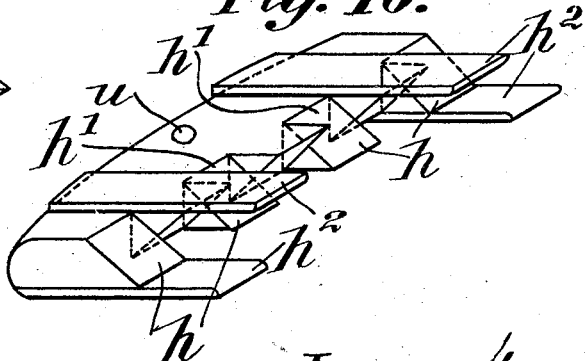

UNITED STATES PATENT OFFICE.

ALEXANDER McGREGOR, OF GLASGOW, SCOTLAND.

TOOL HOLDER OR CHUCK.

No. 929,466.      Specification of Letters Patent.      Patented July 27, 1909.

Application filed March 25, 1908. Serial No. 423,105.

*To all whom it may concern:*

Be it known that I, ALEXANDER McGREGOR, residing at 8 Jail Square, Glasgow, Scotland, a subject of the King of Great Britain, have invented a certain new and useful Improved Tool Holder or Chuck, of which the following is a specification.

This invention relates to tool holders or chucks for holding any tool or other articles having either a parallel or tapered end or shank.

Under my invention I provide an improved and simplified tool holder or chuck, comprising toothed jaws, the outside of the jaws being curved or tapered or wedge shaped at both ends. The chuck is arranged within a holder the end or head of which is formed with a wedge shaped or tapered opening which engages with the front tapering end of the chuck jaws. The holder is also provided with an internally tapered sliding block, nut, or such like, adapted to engage with and compress the back tapering end of the jaws and with a fixed block through which the screwed end of the drill spindle or the like passes so as to bear against the sliding block and thus cause the latter to move up against the tapering end of the chuck jaws. The arrangement is such that the chuck jaws will engage and grip the end or shank of the tool or other article whether it is tapered or parallel, this being accomplished by the double wedge or curved formation of the jaws which, in engaging with the tapered front end of the holder and the internally tapered sliding block, are closed so as to grip and hold the tool in position.

If desired the holder may be made so that a nut or the like which is internally tapered or coned can be caused to move on the same and cause the jaws to grasp and hold the tool or other article. A suitable means would preferably be provided to keep the jaws of the chuck normally apart, and the teeth on the chuck jaws may be so cut that they will never be completely out of engagement with each other.

In order that my invention may be clearly understood, I have hereunto appended an explanatory sheet of drawings, whereon:—

Figure 1:
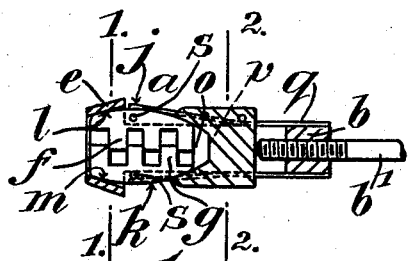
Figure 2:
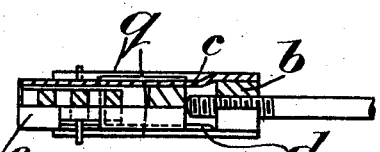
Figure 5:
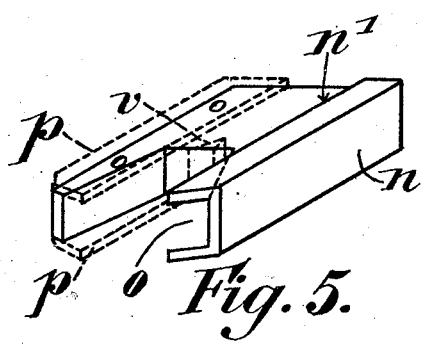
Figure 3:
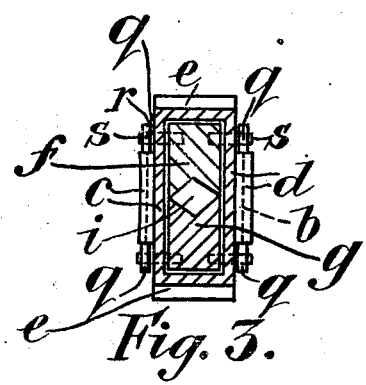
Figure 4:
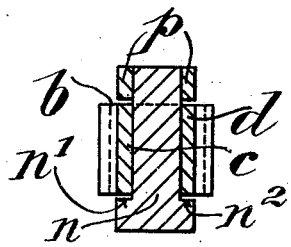

Figure 1 is a longitudinal section of the tool holder or chuck showing the same screwed on a drilling machine spindle. Fig. 2 is a plan view, the one half being shown in section. Fig. 3 is an enlarged cross section taken on the line 1—1 Fig. 1. Fig. 4 is an enlarged cross section taken on the line 2—2 Fig. 1. Fig. 5 is an isometrical perspective view of the internally tapered sliding thrust block $n$. Fig. 6 shows, in section, a modified construction of the invention. Fig. 7 is a plan view of Fig. 6. Fig. 8 is a side elevation of the tool holder or chuck illustrated at Fig. 6. Fig. 9 is an isometrical perspective view of one of the toothed jaws $f$. Fig. 10 illustrates a modified form of jaw.

The same reference letters wherever repeated indicate the same parts.

In carrying out my invention I provide a tool holder or chuck $a$ which as shown at Fig. 1 is formed with an internally screwed part $b$ by means of which the tool-holder or chuck is secured on the screwed end of the driving spindle $b^1$.

Secured to or made one with the part $b$ are two plates $c, d$, which form a parallel sided guide or frame having, at the front end thereof, and one therewith, an internally-tapered head or casing $e$. Slidably fitted between the plates $c, d$, are two jaws $f, g$, having their inner faces provided with projections or teeth $h$ which are preferably of the form shown at Figs. 9 and 10. The projections $h$ on the one jaw are arranged so as to enter into the spaces $h^1$ between the projections on the other jaw, and, at the same time to leave a central diamond shaped passage $i$ as shown at Fig. 3 into which the tool, wire or other article to be held may be inserted. The outer faces $j, k$, of the jaws $f, g$, are made curved or tapered (see Figs. 7, 6, 8, 9 and 10) and are adapted to bear against the internally tapered sides $l, m$, of the head or casing $e$.

Slidably and removably fitted between the plates $c, d$, is a T shaped thrust block $n$ (see Fig. 4) having shoulders $n^1, n^2$, and at its operating end (see Fig. 5) a tapered recess $o$ adapted to engage the rear end of the curved or tapered faces $j, k$, of the jaws $f, g$. The sliding block $n$ is inserted between the plates $c, d$, and is held in place against play or movement by the shoulders $n^1$, $n^2$, on the one side and two cover pieces or plates $p, p$, which latter are screwed, riveted or otherwise secured at the opposite side (see Fig. 4) to said thrust block $n$. The inner edges of the cover plates $p, p$, and the shoulders $n^1, n^2$, of the T shaped thrust block $n$ abut against and are guided, during the movements of said block by the plates $c, d$, which form the parallel guide or frame.

If desired the jaws $f, g$, of the chuck may be normally held apart by flat or plate springs $q$, two on each side of the blocks, the fixed end of each spring being secured to the part $b$, while the free end $r$ of each spring engages a pin $s$ one secured in each jaw, $f, g$. Instead of plate springs as shown at Figs. 1, 2, and 3 I may use a spiral or coiled spring (such as $t$ Figs. 6 and 8) one in each side of the jaws the ends of the springs being inserted in holes $u$ in the jaws, or the ends of the springs may be fixed in any other suitable manner.

If desired the thrust block $n$ may be provided with a recess $v$ (see dotted lines Figs. 2 and 5) into which the shank end of the drill enters so that the latter may have a positive drive.

The tool holder or chuck $a$ illustrated at Fig. 6 is adapted to be used with a handle $a^1$, or, if desired, this style of chuck may be attached by any suitable means, to a drilling spindle. This chuck, as before, comprises a head or casing $e$ secured to or made in one with a hollow spindle $w$ which latter may be inserted into the handle $a^1$, or, when desired, the hollow spindle $w$ may be suitably attached to a drilling spindle. The hollow spindle, under this construction, is slotted for a part of its length and into the slot thus formed is inserted the jaws $f, g$, which have been already described. The hollow spindle $w$ is screwed externally for a part of its length and is provided with a nut $y$, which, at its front end, is cone shaped internally. By turning the cone-shaped nut $y$ in the desired direction, the said nut may be caused to act on the rear tapered or curved faces $j, k$, of the jaws $f, g$, thereby causing the jaws to tightly grip the drill shank, wire, or other article, or to release the same (whether the said shank, etc., is tapered or parallel). When this construction is used with a handle, such as $a^1$ Fig. 6, the latter may be made with a hole $y^1$ for the reception of a wire $y^2$ or other article which can pass right through the handle, the tube $w$ and the chuck. When it is desired to give a positive drive to this form of chuck, a plug indicated in dotted lines at $y^3$ Figs. 6 and 8 having a recess $y^4$ at its outer end, is inserted in and secured at or near the inner end of the hollow spindle $w$. If desired the jaws of the chuck may have fitted at each end thereof, projecting plates $h^2$ so arranged that the plates on the one jaw will interlock with those of the other jaw, and thereby retain the jaws in engagement at all times. (See Fig. 10).

When the holder is in use and the chuck $a$ engages the end or shank of a tool, wire or other article, the sliding block $n$ can be forced by its rotation on the spindle end ($b^1$) against the rear tapered or wedge-shaped ends of the jaws of the chuck forcing the jaws forward so that their tapered front ends are compressed by the tapered head ($e$), in this manner causing the jaws to tightly grip and hold the inserted tool-end or other catch whether the same be tapered or parallel.

The improved chuck may be obviously modified in its details of construction without departing from the invention.

Having now fully described my invention, what I claim and desire to secure by Letters Patent is:—

1. A chuck comprising in combination an internally screw-threaded member for engagement with a driving spindle, parallel plates carried by said member and having at their free ends an internally tapered head, jaws slidingly fitted between said plates, a T-shaped thrust block slidably and removably fitted between said plates and having a recess to engage the rear ends of said jaws, and cover plates secured to said thrust block, said thrust block being formed with shoulders coöperating with the inner edges of said cover plates to hold the thrust block in position.

2. A chuck comprising in combination an internally screw-threaded member for engagement with a driving spindle, parallel plates carried by said member and having at their free ends an internally tapered head, jaws slidingly fitted between said plates, a T-shaped thrust block slidably and removably fitted between said plates and having a recess to engage the rear ends of said jaws, and cover plates secured to said thrust block, said thrust block being formed with shoulders coöperating with the inner edges of said cover plates to hold the thrust block in position, the said jaws being provided with alternately disposed interengaging projections constructed to leave a central passage for the reception of the tool.

3. A chuck comprising in combination an internally screw-threaded member for engagement with a driving spindle, parallel plates carried by said member and having at their free ends an internally tapered head, jaws slidingly fitted between said plates, a T-shaped thrust block slidably and removably fitted between said plates and having a recess to engage the rear ends of said jaws, and cover plates secured to said thrust block, said thrust block being formed with shoulders coöperating with the inner edges of said cover plates to hold the thrust block in position, the said jaws being provided with alternately disposed interengaging projections constructed to leave a central passage for the reception of the tool and at the ends with projecting interlocking plates.

In testimony whereof I affix my signature in presence of two witnesses.

ALEXANDER McGREGOR.

Witnesses:
GEORGE WOLFE BRUCE,
ROBERT A. THOMPSON.